United States Patent [19]

Matsumoto et al.

[11] Patent Number: 4,875,748
[45] Date of Patent: Oct. 24, 1989

[54] POLYGON MIRROR

[75] Inventors: Yasuo Matsumoto, Numazu; Kazunori Murakami; Tomonori Ikumi, both of Shizuoka; Yasuo Iwafune, Tokyo, all of Japan

[73] Assignee: Tokyo Electric Co., Ltd., Tokyo, Japan

[21] Appl. No.: 214,605

[22] Filed: Jul. 1, 1988

[30] Foreign Application Priority Data

Jul. 6, 1987 [JP] Japan ................................ 62-168029

[51] Int. Cl.$^4$ .............................................. G02B 26/10
[52] U.S. Cl. ........................................ 350/6.8; 350/6.7
[58] Field of Search ................. 350/6.5, 6.6, 6.7, 6.8; 346/108, 160; 355/8, 66; 358/285

[56] References Cited

U.S. PATENT DOCUMENTS 4,357,071 11/1982 Mankel et al. ................. 350/6.8

FOREIGN PATENT DOCUMENTS

58-105104 6/1983 Japan .................................... 350/6.7
61-156020 7/1986 Japan .
61-296324 12/1986 Japan .

Primary Examiner—Bruce Y. Arnold
Assistant Examiner—Loha Ben
Attorney, Agent, or Firm—Frishauf, Holtz, Goodman & Woodward

[57] ABSTRACT

A polygon mirror has a plurality of elliptically-curved convex mirror surfaces functioning as light reflection surfaces, each having substantially the same shape as the maximum curvature portion of an ellipse which has long axis b and short axis c. The convex mirror surfaces are uniformly arranged on the circumference of an inscribed circle whose center is set on the long axis b, whose radius is Rm, and which is in contact with the maximum curvature portion of the ellipse. The polygon mirror reflects an incident light beam while being rotated, and scans the incident light beam in the range of effective scanning length Lo on a preset scanning plane which is set at incident light beam travelling distance R from the center of the inscribed circle of the polygon mirror.

16 Claims, 10 Drawing Sheets

POLYGON MIRROR

BACKGROUND OF THE INVENTION

1. Field of the Invention

This invention relates to an improvement of a polygon mirror used in a post-objective type light deflector.

2. Description of the Related Art

Optical scanning devices used in optical systems incorporated in laser printers or the like can be divided into two main types: one is the post-objective type, in which light is focused into a beam by a focusing lens and then sent to a light deflector, and the other is the pre-objective type, in which light is first deflected by means of a light deflector and then focused by a focusing lens.

Since, in the case of the first type of scanning device, the light beam is focused before reaching the deflector, the focusing lens can therefore be small and simple in construction. However, in this case, since the beam focusing spot is generally set on a curved surface, an error in the scanning linearity and the curvature of image field will increase.

In the case of the latter type device, in contrast, the beam is first deflected by the light deflector, before being focused by the focusing lens, so that the beam spot can be easily set on a flat plane and therefore an error in the scanning linearity and the curvature of image field can be easily corrected. However, in this case, it is necessary to use a wide angle lens, such as an $f\theta$ lens, as the focusing lens, in order to obtain a proper deflection angle, making the lens construction complex.

As has been made clear above, each of the two types of scanning devices (post-objective type and pre-objective type) has its advantages as well as disadvantages.

In the case of the conventional post objective light deflector disclosed in Japanese Patent Disclosure (Kokai) No. 61-156020, for example, an error in the curvature of the image field is corrected by use of a polygon mirror having a spherical or cylindrical convex reflection surface with a radius of curvature, and the error in scanning linearity is corrected by a succeeding electrical correction processing (the clock frequency of the image signal is changed according to variation in the scanning speed).

However, the above conventional device has the disadvantage that it is necessary to effect electrical correction processing in order to correct the error in the scanning linearity.

SUMMARY OF THE INVENTION

An object of the present invention is to provide a polygon mirror, for use with a post objective light deflector, which is capable of suppressing to a minimum, any error in the scanning linearity and the curvature of image field, without effecting the electrical correction processing and enhancing the accuracy of a pattern obtained by a scanning operation.

This object can be attained by the use of a post objective light deflector having elliptically-curved convex reflection surfaces, and which will now be described.

Each of the convex reflection surfaces of the above light deflector is defined by part of an imaginary ellipse, the major axis of which is so arranged as to pass through the rotation center of the polygon mirror. The ellipse has long and short radii b and c these being the major and minor axes, respectively, and rotation axis O, which passes long radius b and extends in a direction perpendicular to the major and minor axes (radii b and c). Assume that the radius of an inscribed circle of the polygon mirror is Rm, the distance from rotation axis O to scanning plane SP is R, the effective scanning length is Lo, rotation angle $\theta$ of the polygon mirror is set at "0", as is also beam position y when the major axis (corresponding to long radius b) crosses scanning plane SP at right angles, and that $\theta$ is set at "$\theta o$" when beam position y is set at Lo/2. This being so, the following equations can be obtained in the range of rotation angle $\theta$ ($-\theta o \leq \theta \leq \theta o$) of the polygon mirror:

$$xo = \frac{-a + b\sqrt{1 - \frac{a^2 - b^2}{c^2}\tan^2\theta}}{1 + \frac{b^2}{c^2}\tan^2\theta}$$

$$yo = xo \cdot \tan\theta$$

$$\gamma = \sqrt{xo^2 + yo^2}$$

$$\beta = \tan^{-1}\left(\frac{b^2}{c^2} \cdot \frac{yo}{xo + a}\right)$$

$$l = \frac{c^2(R - Rm)}{2b(R - Rm) + c^2} - Rm$$

$$\frac{dx}{d\theta} = -\frac{(l + \gamma)\sin\beta}{\cos(\theta - \beta)}$$

$$\frac{dy}{d\theta} = \frac{(l + \gamma)\cos\beta}{\cos(\theta - \beta)}$$

$$\frac{d\beta}{d\theta} = \frac{\frac{b^2}{c^2}\left(\frac{l+\gamma}{xo+a}\right)\left(\frac{yo \cdot \sin\beta}{xo+a} + \cos\beta\right)}{\left\{1 + \frac{b^4 \cdot yo^2}{c^4(xo+a)^2}\right\}\cos(\theta - \beta)}$$

$$xc = xo + \frac{\left(\frac{dy}{d\theta} - \frac{dx}{d\theta}\tan(2\beta - \theta)\right)\cos^2(2\beta - \theta)}{1 - 2\frac{d\beta}{d\theta}}$$

$$yc = yo + \frac{\left(\frac{dy}{d\theta} - \frac{dx}{d\theta}\tan(2\beta - \theta)\right)\cos^2(2\beta - \theta)\tan(2\beta - \theta)}{1 - 2\frac{d\beta}{d\theta}}$$

Assuming that $a = b - Rm$, then the following expressions can be obtained:

$$-0.02Lo \leq (R - \gamma)\tan2(\theta - \beta) - \frac{\theta}{\theta o}Lo \leq 0.02Lo$$

(error in the scanning linearity)

$-0.05 R < xc \cdot \cos\theta + yc \cdot \sin\theta - R \leq 0.05R$ (error in the curvature of image field).

BRIEF DESCRIPTION OF THE DRAWINGS

FIGS. 8A, 8B to 16A, 16B are diagrams showing the simulation results indicating the degree of improvement obtained with regard to reducing the error in scanning linearity and the curvature of image field by using the polygon mirror according to this invention.

DETAILED DESCRIPTION OF THE PREFERRED EMBODIMENTS

An embodiment of this invention will now be described, with reference to the accompanying drawings. For ease of understanding, corresponding portions shown in several of the drawings are denoted by the same reference numerals, and hence, additional explanation thereof will be omitted.

Figure 1:
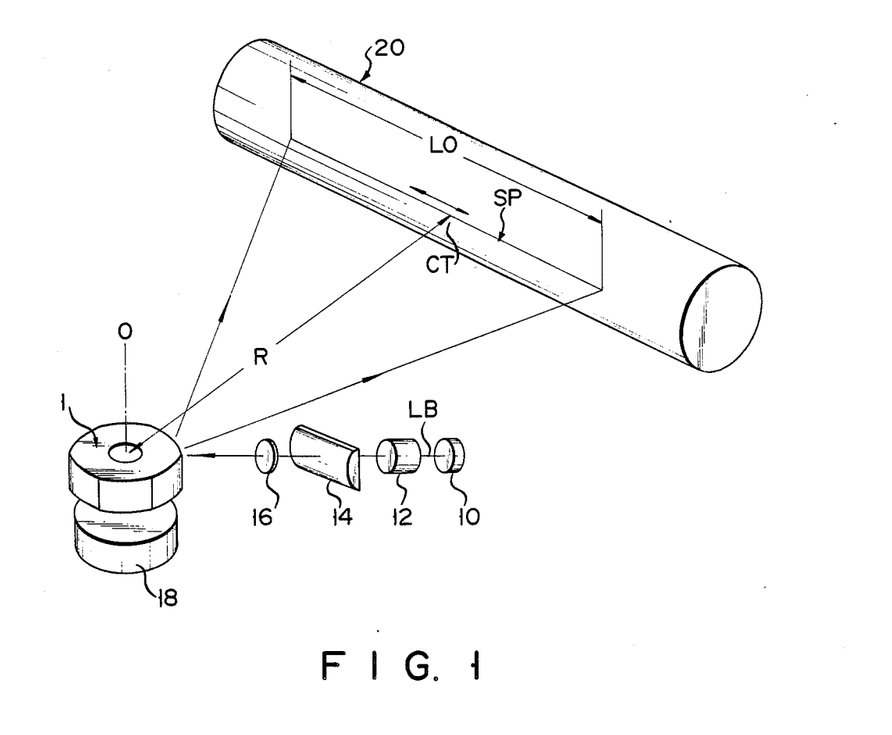
FIG. 1 is a perspective view schematically illustrating the construction of a post objective light deflector using a polygon mirror according to one embodiment of this invention.
Figure 2:
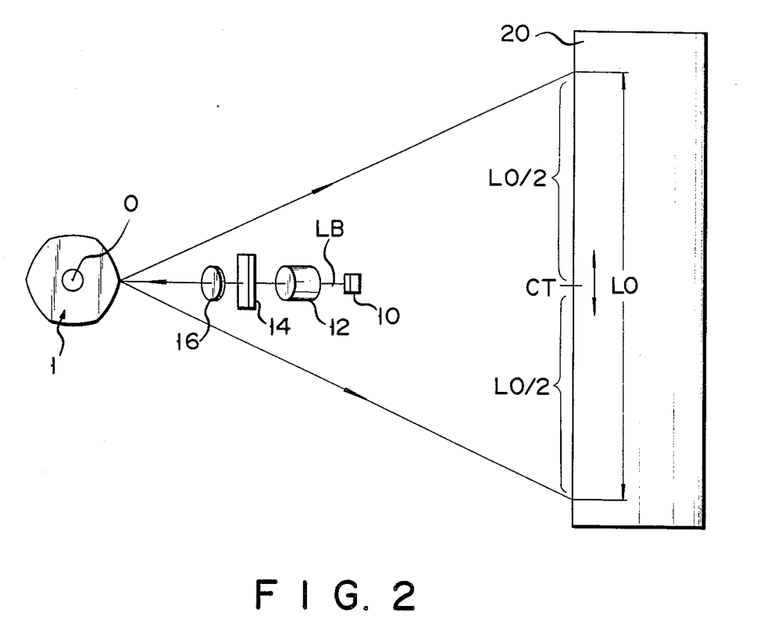
FIG. 2 is a top plan view of the device shown in FIG. 1.
Figure 3:
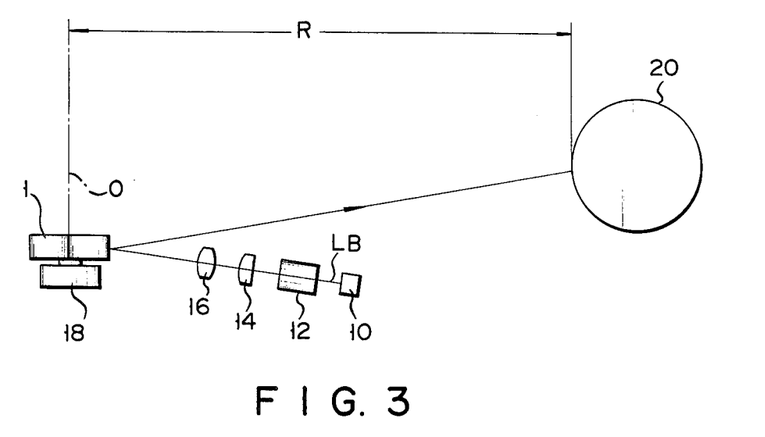
FIG. 3 is a side view of the device shown in FIG. 1.

FIG. 1 shows the construction of a post objective light deflector using polygon mirror 1 according to one embodiment of this invention. FIGS. 2 and 3 are, respectively, top and side views of FIG. 1.

Referring to FIGS. 1 to 3, it can be seen that laser beam LB emitted from laser diode 10 is irradiated via light collimating objective lens 12, cylindrical lens 14, and spherical lens 16, onto one of six light reflection surfaces of hexagonal polygon mirror 1, from which it is reflected and projected onto scanning plane SP of photoreceptor drum 20, which is set apart from rotation axis O of polygon mirror 1 by distance R.

Motor 18 is used to rotate polygon mirror 1 so that laser beam LB reflected therefrom can be deflected within a range of ±Lo/2 with respect to the center (focusing position) CT of scanning plane SP of drum 20.

With the exception of the convex shape of the reflection surface of polygon mirror 1 and the relation between polygon mirror 1 and scanning plane SP, the construction of this invention, as it is shown in FIGS. 1 to 3, can be modified according to the disclosure of the following U.S. Patent specifications:

(1) U.S. Pat. No. 4,383,755 (Fedder et al.: May 17, 1983);

(2) U.S. Pat. No. 3,970,359 (Starkweather; July 20, 1976);

(3) U.S. Pat. No. 4,101,193 (Waterworth et al.; July 18, 1978);

(4) U.S. Pat. No. 4,578,689 (Spencer et al.: Mar. 25, 1986);

(5) U.S. Pat. No. 4,633,272 (Hardy; Dec. 30, 1986);

(6) U.S. Pat. No. 4,651,169 (Muka; Mar. 17, 1987).

It should be understood that the contents disclosed in the above U.S. Patent specifications are incorporated in this invention.

In FIG. 1, polygon mirror 1 is illustrated in a sliced-pineapple ring form, but it can be obtained by slicing a hexagonal hollow cylindrical body having convex side surfaces or a football-like body having six side surfaces. Further, each of the six side surfaces has a curvature defined by part of the outer surface of an elliptic cylinder.

Figure 4:
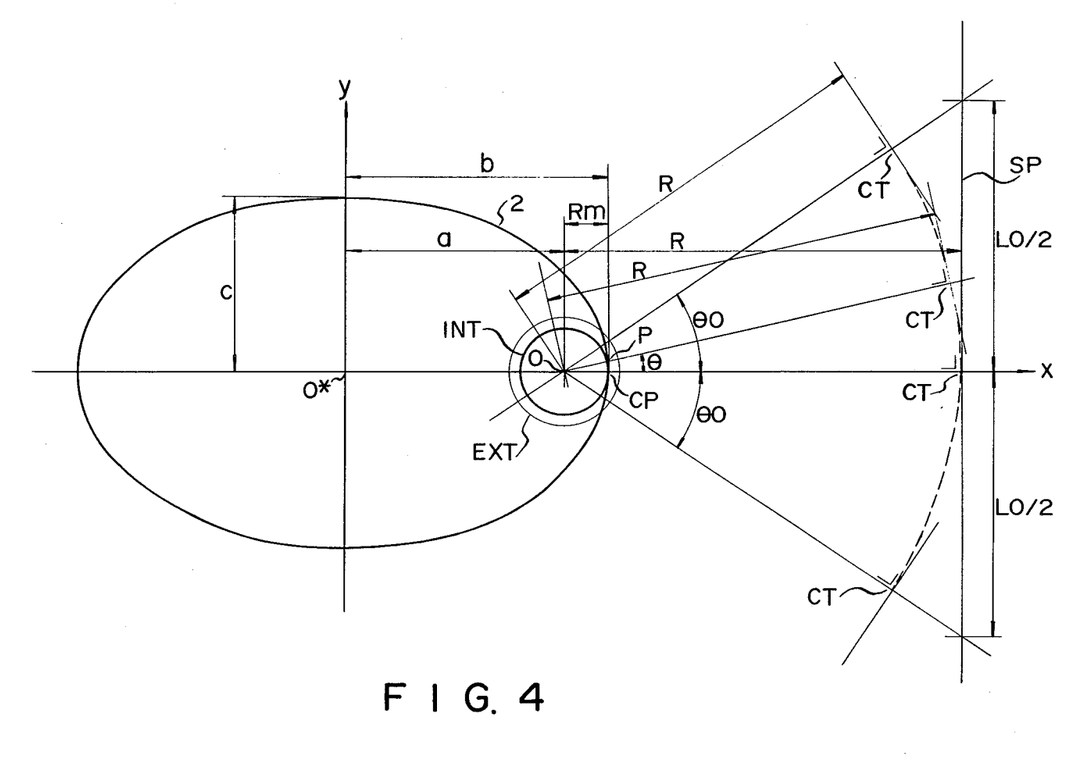
FIG. 4 is a diagram showing the geometrical relation between the elliptically curved surface and rotation center of the polygon mirror and the light beam scanning plane.
Figure 5:
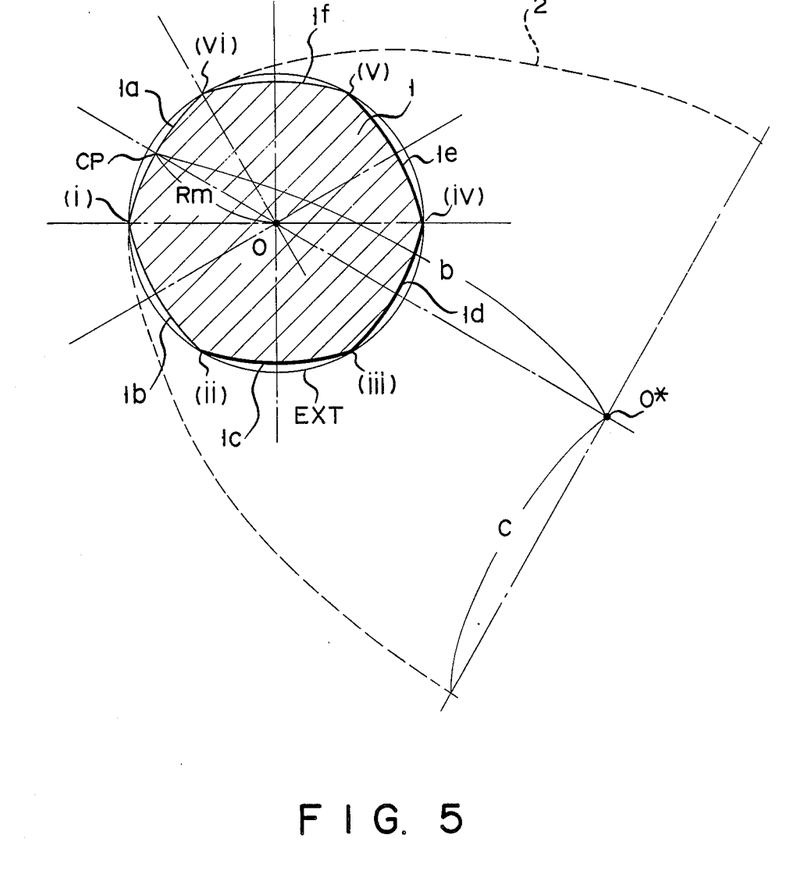
FIG. 5 is an enlargement of a portion of FIG. 4, showing part of the polygon mirror.

FIG. 4 shows the geometrical relation between elliptic outer surface 2 of an elliptic cylinder, part of which constitutes one of the reflection surfaces of polygon mirror 1, rotation center O of polygon mirror 1, and light beam scanning plane SP, and FIG. 5 is an enlargement of a portion of FIG. 4, showing part of polygon mirror 1.

With regard to the x-y plane of FIG. 4, short radius c of elliptic outer surface 2 lies on the y axis, and long radius b thereof lies on the x axis. The curvature of elliptic outer surface 2 continuously varies as the x or y value varies, and reaches a minimum when surface 2 is on the y axis (x=0), and a maximum when it is on the x axis (y=0).

Inscribed circle INT of polygon mirror 1 has radius Rm and is in contact with maximum curvature portion CP (y=0) of elliptic outer surface 2. FIG. 5 shows an enlargement of a portion of polygon mirror 1 including maximum curvature portion CP.

As is shown in FIG. 5, polygon mirror 1 has six elliptic mirror surfaces $1a$ to $1f$, and six edges (i) to (vi) which are in contact with circumscribed circle EXT. Mirror surface $1a$, corresponding to part of elliptic outer surface 2, is symmetrical with respect to the major axis (corresponding to long radius b) which passes through maximum curvature portion CP. The curvature of mirror surface $1a$ reaches a maximum at maximum curvature portion CP, and gradually decreases at a given rate as a curvature defining point moves from CP to edge (i) or (vi) on mirror surface $1a$. This feature is obtained by using part of elliptic surface 2 as the mirror surface of polygon mirror 1, and is utilized by the present invention to reduce an error in the curvature of the image field and in the scanning linearity on scanning plane SP, thereby to dispense with the need for an $f\theta$ lens and electrical error-correction means.

The way in which the elliptically curved surface of polygon mirror 1 is used in this invention to attain the above error-reducing effect will now be explained in detail. In this case, center O of inscribed circuit INT is used as the origin of the x-y plane.

Figure 6:
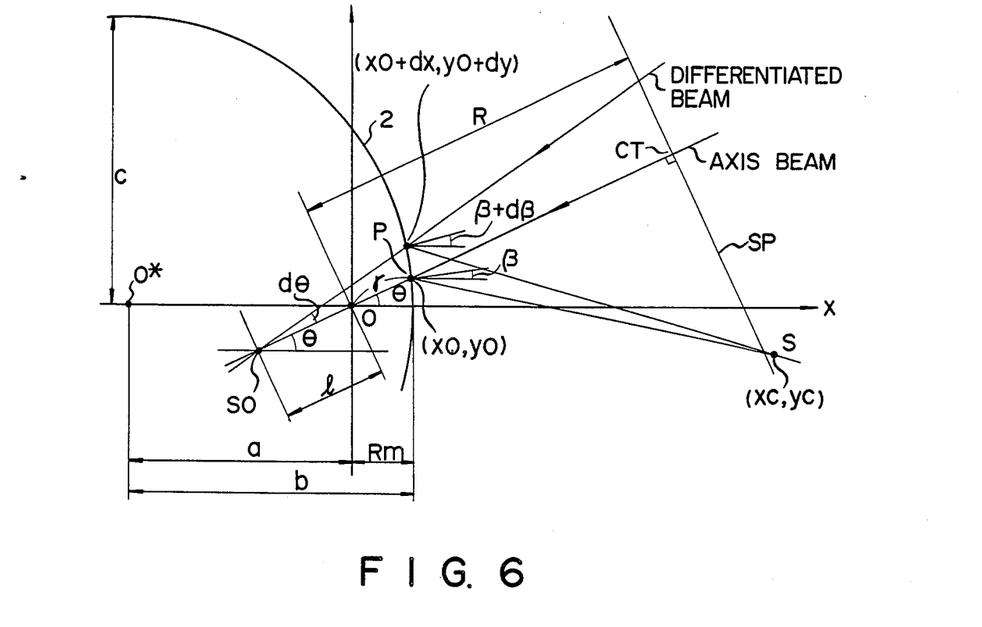
FIG. 6 is a diagram showing the geometrical relation between the elliptically curved surface of the polygon mirror and the light beam scanning plane.

Assume now that, as is shown in FIG. 6, an axis light beam and differentiated light beam from lens 16 of FIG. 1 are projected to be focused on point So and reflected from the reflection surface to form an image on point S. In this case, point So is set in position apart from rotation axis O by distance l.

Next, coordinates (xc, yc) of focusing point S are determined as follows, by using x and y axes corresponding to radii b and c of ellipse 2.

The formula expressing ellipse 2 is given as follows:

$$\frac{(x+a)^2}{b^2} + \frac{y^2}{c^2} = 1 \tag{1}$$

the axis light beam and the differentiated light beam are expressed as follows:

$$y = (\text{axis light beam}) = x \cdot \tan \theta \tag{2}$$

$$y + l \cdot \sin (\text{differentiated light beam}) = (x + l \cdot \cos \theta) \cdot \tan (\theta + d\theta) \tag{3}$$

and the reflected axis and differentiated light beams are expressed as follows:

$$y - yo \text{ (reflected axis light beam)} = (x - xo) \cdot \tan(2\beta - \theta) \qquad (4)$$

$$y = (yo + dy) \text{ (reflected differentiated light beam)} = \{x - (xo + dx)\} \cdot \tan\{2(\beta + d\beta) - (\theta + d\theta)\} \qquad (5)$$

If secondary and higher order derivatives are neglected in equation (5), the following equation can be obtained:

$$(y - yo)dy = (x - xo)\tan(2\beta - \theta) + (x + xo)\frac{(2d\beta - 2\theta)}{\cos^2(2\beta - \theta)} - dx \cdot \tan(2\beta - \theta) \qquad (6)$$

Based on equations (4) and (6), the coordinates of the intersection (focusing point S) of the reflected axis and differentiated light beams can be obtained as follows:

$$xc = xo + \frac{\left(\frac{dy}{d\theta} - \frac{dx}{d\theta}\tan(2\beta - \theta)\right)\cos^2(2\beta - \theta)}{1 - 2\frac{d\beta}{d\theta}} \qquad (7)$$

$$yc = yo + \frac{\left(\frac{dy}{d\theta} - \frac{dx}{d\theta}\tan(2\beta - \theta)\right)\cos^2(2\beta - \theta)\tan(2\beta - \theta)}{1 - 2\frac{d\beta}{d\theta}} \qquad (8)$$

In this case, xo and yo can be expressed as a function of $\theta$, as follows:

$$xo = \frac{-a + b\sqrt{1 - \frac{a^2 - b^2}{c^2}\tan^2\theta}}{1 + \frac{b^2}{c^2}\tan^2\theta} \qquad (9)$$

$$yo = \frac{-a + b\sqrt{1 - \frac{a^2 - b^2}{c^2}\tan^2\theta}}{1 + \frac{b^2}{c^2}\tan^2\theta} \cdot \tan\theta \qquad (10)$$

Further, $\beta$ can be expressed as

Further, $\beta$ can be expressed as $$\beta = \tan^{-1}\left(\frac{b^2}{c^2} \cdot \frac{yo}{xo + a}\right) \qquad (11)$$

Figure 7:
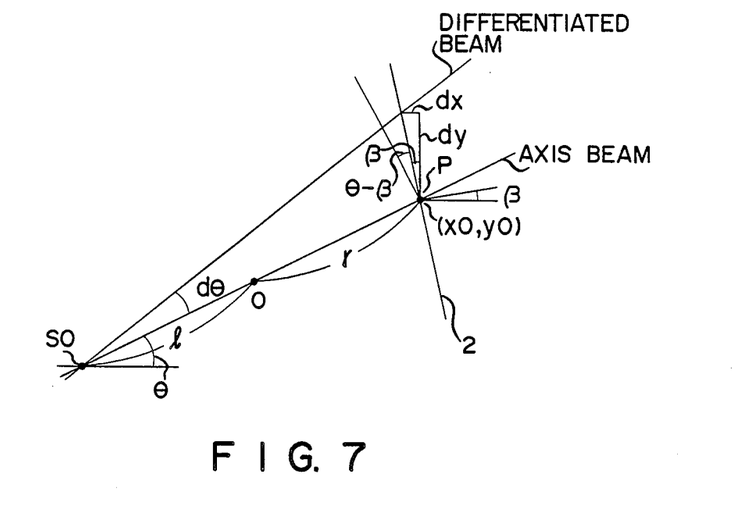
FIG. 7 is a diagram showing part of FIG. 6, for explaining the aforementioned geometrical relation more in detail.

As can be clearly seen from FIG. 7, differential coefficients $dx/d\theta$ and $dy/d\theta$ can be derived as follows:

$$dx = -\frac{(l + \gamma)\sin\beta}{\cos(\theta - \beta)} \cdot d\theta \qquad (12)$$

$$dy = \frac{(l + \gamma)\cos\beta}{\cos(\theta - \beta)} \cdot d\theta \qquad (13)$$

wherein $\gamma$ can be expressed as $$\gamma = \frac{-ac^2\cos\theta + bc\sqrt{(a^2 - b^2 + c^2)\cos^2\theta - a^2 + b^2}}{(c^2 - b^2)\cos^2\theta - b^2} \qquad (14)$$

$$= \sqrt{xo^2 + yo^2}$$

From equations (12) and (13), the differential coefficients can be obtained as follows:

$$\frac{dx}{d\theta} = -\frac{(l + \gamma)\sin\beta}{\cos(\theta - \beta)} \qquad (15)$$

$$\frac{dy}{d\theta} = -\frac{(l + \gamma)\cos\beta}{\cos(\theta - \beta)} \qquad (16)$$

In equations (7) and (8), $d\beta/d\theta$ is the only unknown variable, and can be obtained as follows, based on equations (9), (10), and (11):

$$\frac{d\beta}{d\theta} = \frac{\frac{b^2}{c^2}\left(\frac{l + \gamma}{xo + a}\right)\left(\frac{yo \cdot \sin\beta}{xo + a} + \cos\beta\right)}{\left\{1 + \frac{b_o^4 \cdot y^2}{c^4(xo + a)^2}\right\}\cos(\theta - \beta)} \qquad (17)$$

Equations (7) and (8) can be converted into equations (19) and (20) as follows, by using the rotation formula of the following equation (18) and focusing point S (xc, yc) on the fixed coordinate system:

$$\begin{pmatrix} xc \\ yc \end{pmatrix} = \begin{pmatrix} \cos\theta & \sin\theta \\ -\sin\theta & \cos\theta \end{pmatrix} \begin{pmatrix} xc \\ yc \end{pmatrix} \qquad (18)$$

$$xc = xo(\cos\theta + \sin\theta \cdot \tan\theta) + \frac{\left(\frac{dy}{d\theta} - \frac{dx}{d\theta}\tan(2\beta - \theta)\right)\{\cos\theta + \tan(2\beta - \theta)\sin\theta\}\cos^2(2\beta - \theta)}{1 - 2\frac{d\beta}{d\theta}} \qquad (19)$$

$$yc = \frac{\left(\frac{dy}{d\theta} - \frac{dx}{d\theta}\tan(2\beta - \theta)\right)\{\tan(2\beta - \theta)\cos\theta - \sin\theta\}\cos^2(2\beta - \theta)}{1 - 2\frac{d\beta}{d\theta}} \qquad (20)$$

Further, l can be expressed as follows, based on the condition of image formation when $\theta = 0$:

$$l = \frac{c^2(R - Rm)}{2b(R - Rm) + c^2} - Rm \qquad (21)$$

An optical simulation was effected to detect the condition in which an error in the scanning linearity can be suppressed within ±2% and the curvature of the image field can be set within 5% of length R of the optical scanning path. In this case, the rotation angle of 60° of polygon mirror 1 is set to correspond to one scanning cycle, in order that the rotation angle of 40° of polygon mirror 1 can cover the image formation spot area of 220 mm, and an error in the scanning linearity at scanning plane center CT is suppressed to 0. As a result of the optical simulation, it was found that radii b and c along the major and minor axes of ellipse 2 and distance R of the spot position from rotation center O of polygon mirror 1 can be determined in the above-described condition, so that an error in the scanning linearity can be set within ±2% and the curvature of the image field can be set within ±0.05R (within 5% of length R of the optical scanning path). Next, several results of the simulation carried out to satisfy the condition described above will be explained.

Figure 8A:
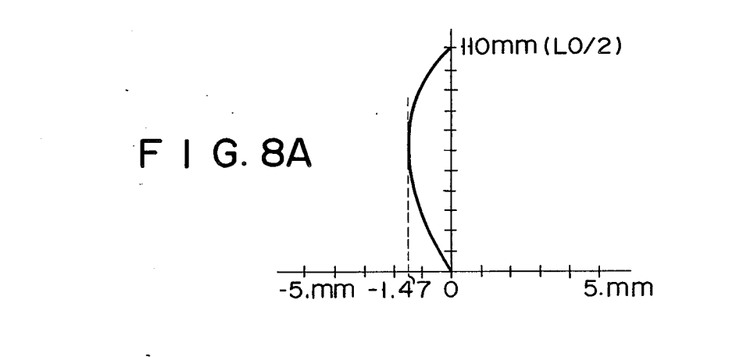
Figure 8B:
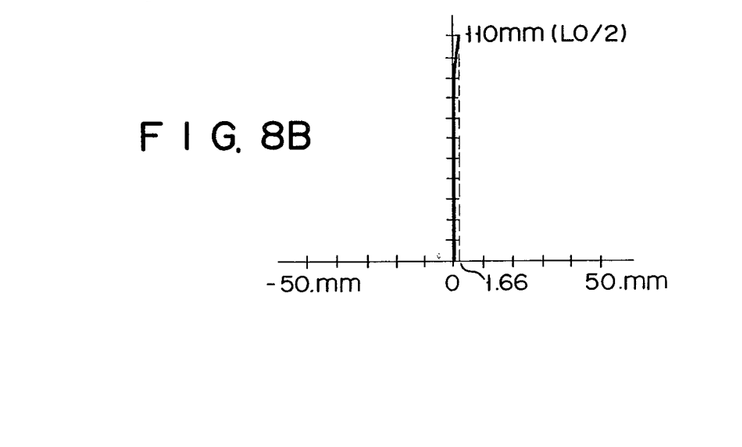

FIGS. 8A and 8B show the result of simulation in which distance R of focusing point CT from rotation center O of polygon mirror 1 was set to 350 mm, radius Rm of the inscribed circle of polygon mirror 1 was set to 22.65625 mm, and long and short radii b and c of ellipse 2 were respectively set to 264.96875 mm and 105.908431 mm. When polygon mirror 1 was rotated through 40°, the beam was scanned over a range of Lo=220 mm on the surface of photoreceptor drum 20 (the plane perpendicular to the optical axis containing focusing point CT at θ=0).

In the above case, is shown in FIG. 8A, the error in scanning linearity was suppressed to the extent that its highest value was below −1.47 mm (−0.67%), and as is shown in FIG. 8B, the curvature of the image field was suppressed to the extent of having a maximum value below 1.66 mm (0.47%).

Figure 9A:
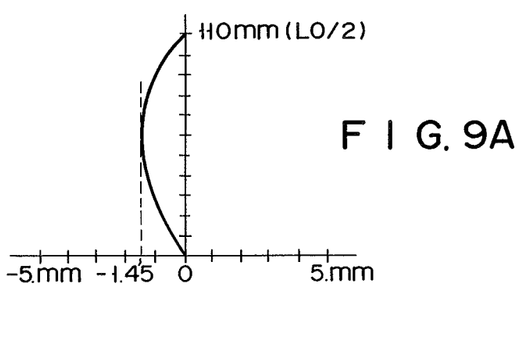
Figure 9B:
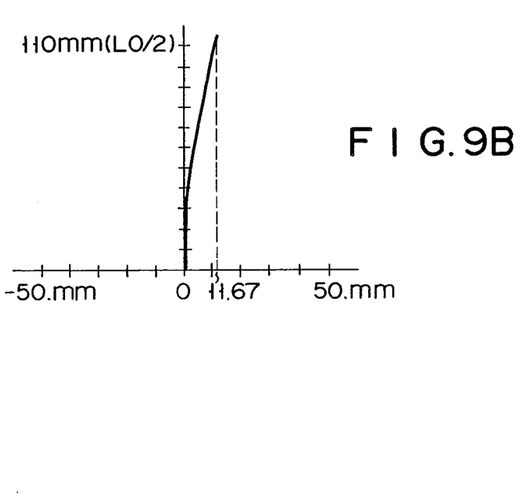

FIGS. 9A and 9B show the result of simulation in which distance R of focusing point CT from rotation center O of polygon mirror 1 was set to 350 mm, radius Rm of the inscribed circle of polygon mirror 1 was set to 24.53125 mm, and long and short radii b and c of ellipse 2 were respectively set to 246.3125 mm and 106.549469 mm.

In this case, as is shown in FIG. 9A, the error in scanning linearity was suppressed such that its highest value was below −1.45 mm (−0.66%), and as is shown in FIG. 9B, the curvature of the image field was suppressed such that its maximum value was below 11.67 mm (3.33%).

Figure 10A:
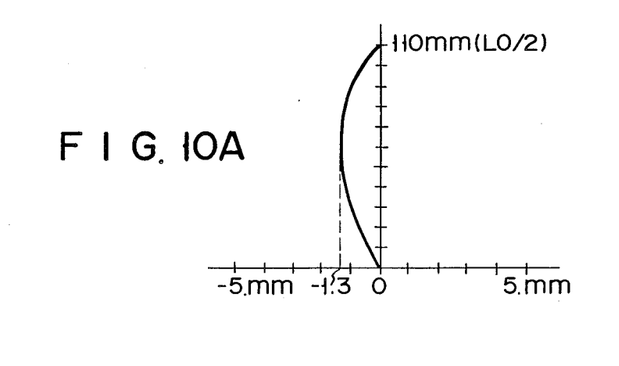
Figure 10B:
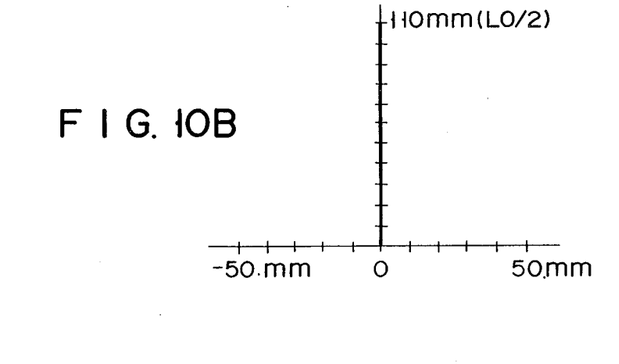

FIGS. 10A and 10B show the result of simulation in which distance R of focusing point CT from rotation center O of polygon mirror 1 was set to 382.65625 mm, radius Rm of the inscribed circle of polygon mirror 1 was set to 25.0 mm, and long and short radii b and c of ellipse 2 were respectively set to 147.671875 mm and 80.2821472 mm.

In this case, as is shown in FIG. 10A, the error in scanning linearity was suppressed such that its highest value was below −1.30 mm (−0.59%), and as is shown in FIG. 10B, the curvature of the image field was suppressed such that its maximum value was below than 0.35 mm (0.09%).

Figure 11A:
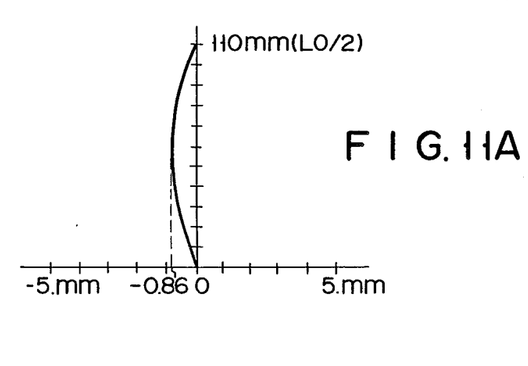
Figure 11B:
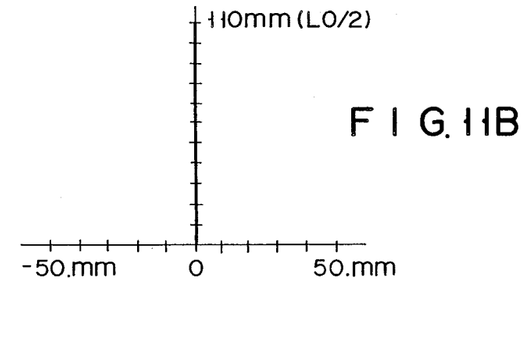

FIGS. 11A and 11B show the result of simulation in which distance R of focusing point CT from rotation center O of polygon mirror 1 was set to 467.5 mm, radius Rm of the inscribed circle of polygon mirror 1 was set to 25.0 mm, and long and short radii b and c of ellipse 2 were respectively set to 165.46875 mm and 85.6534702 mm.

In this case, as is shown in FIG. 11A, the error in scanning linearity was suppressed such that its highest value was below −0.86 mm (−0.39%), and as is shown in FIG. 11B, the curvature of the image field was suppressed such that its maximum value was below 0.16 mm (0.03%).

Figure 12A:
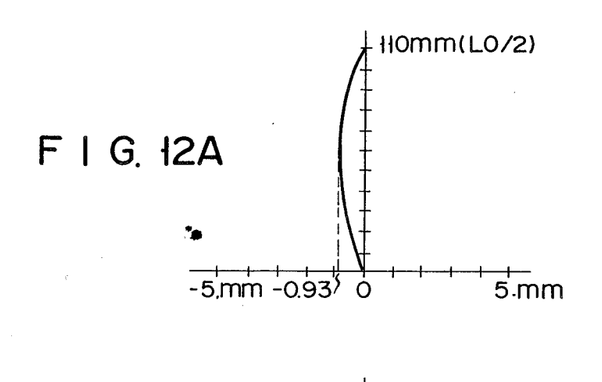
Figure 12B:
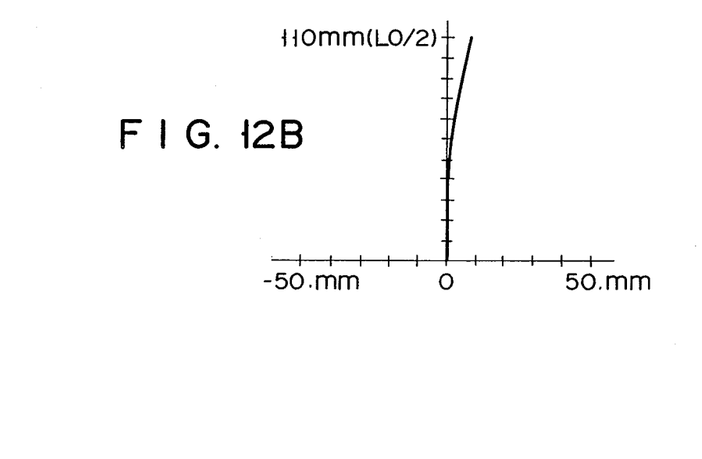

FIGS. 12A and 12B show the result of simulation in which distance R of focusing point CT from rotation center O of polygon mirror 1 was set to 455.0 mm, radius Rm of the inscribed circle of polygon mirror 1 was set to 25.0 mm, and long and short radii b and c of ellipse 2 were respectively set to 101.265625 mm and 64.8617095 mm.

In this case, as is shown in FIG. 12A, the error in scanning linearity was suppressed such that its highest value was below −0.93 mm (−0.42%), and as is shown in FIG. 12B, the curvature of the image field was suppressed such that its maximum value was below 8.52 mm (1.87%).

Figure 13A:
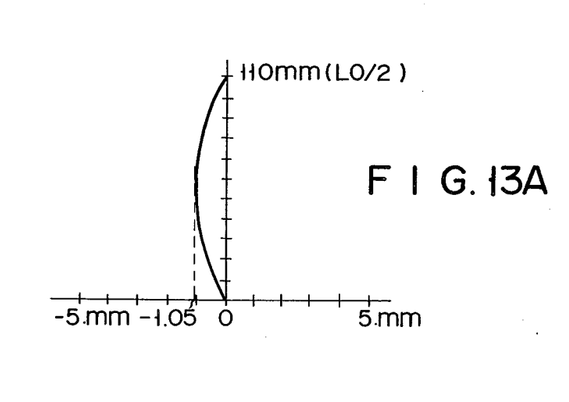
Figure 13B:
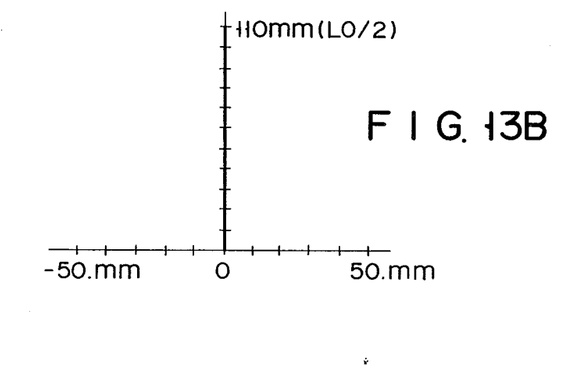

FIGS. 13A and 13B show the result of simulation in which distance R of focusing point CT from rotation center O of polygon mirror 1 was set to 424.375 mm, radius Rm of the inscribed circle of polygon mirror 1 was set to 25.0 mm, and long and short radii b and c of ellipse 2 were respectively set to 147.671875 mm and 80.3066963 mm.

In this case, as is shown in FIG. 13A, the error in scanning linearity was suppressed such that its highest value was below −1.05 mm (−0.48%), and as is shown in FIG. 13B, the curvature of the image field was suppressed such that its maximum value was below 0.21 mm (−0.05%).

Figure 14A:
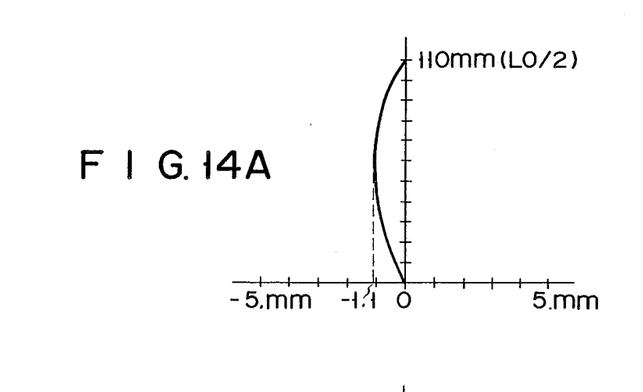
Figure 14B:
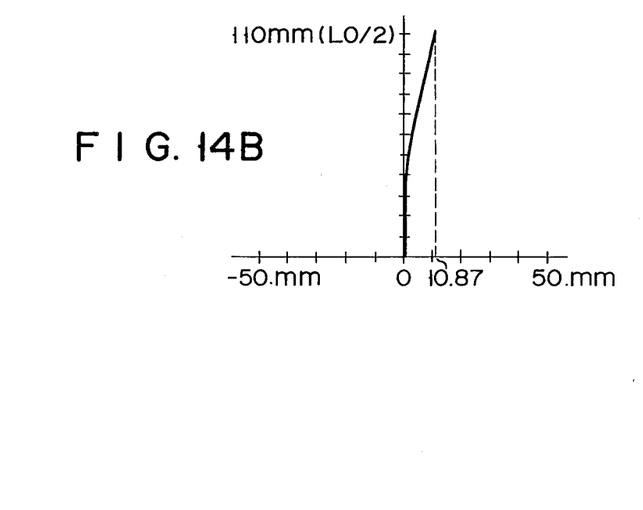

FIGS. 14A and 14B show the result of simulation in which distance R of focusing point CT from rotation center O of polygon mirror 1 was set to 419.375 mm, radius Rm of the inscribed circle of polygon mirror 1 was set to 25.0 mm, and long and short radii b and c of ellipse 2 were respectively set to 93.53125 mm and 61.8695557 mm.

In this case, as is shown in FIG. 14A, the error in scanning linearity was suppressed such that its highest value was below −1.10 mm (−0.50%), and as is shown in FIG. 14B, the curvature of the image field was suppressed such that its maximum value was below 10.87 mm (2.59%).

Figure 15A:
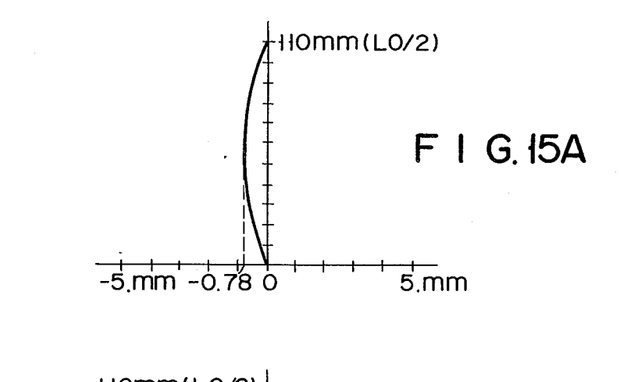
Figure 15B:
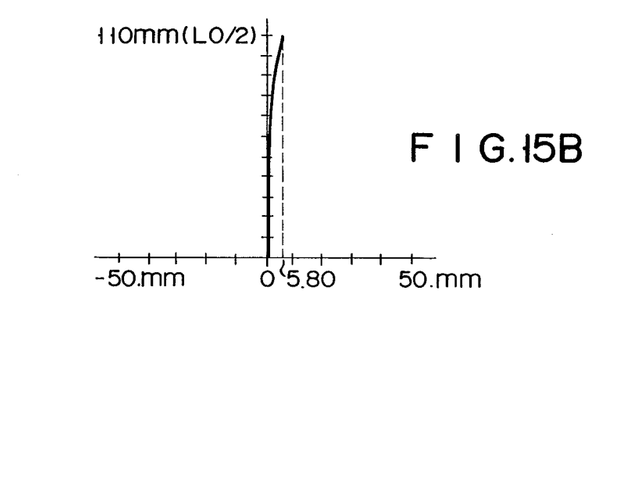

FIGS. 15A and 15B show the result of simulation in which distance R of focusing point CT from rotation center O of polygon mirror 1 was set to 491.875 mm, radius Rm of the inscribed circle of polygon mirror 1 was set to 25.0 mm, and long and short radii b and c of ellipse 2 were respectively set to 118.828125 mm and 71.2061837 mm.

In this case, as is shown in FIG. 15A, the error in scanning linearity was suppressed such that its highest value was below −0.78 mm (−0.36%), and as is shown in FIG. 15B, the curvature of the image field was suppressed such that its maximum value was below 5.80 mm (1.18%).

Figure 16A:
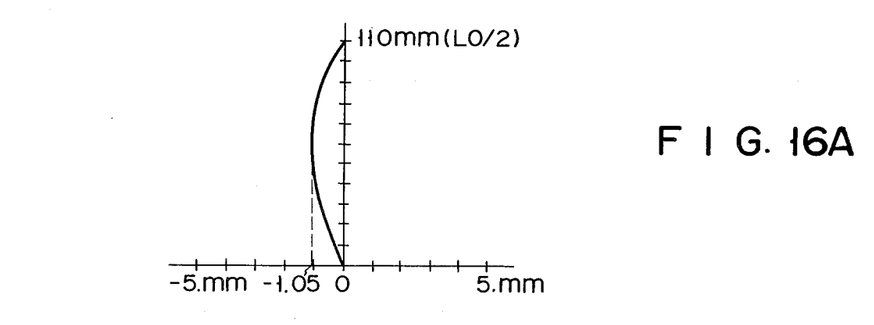
Figure 16B:
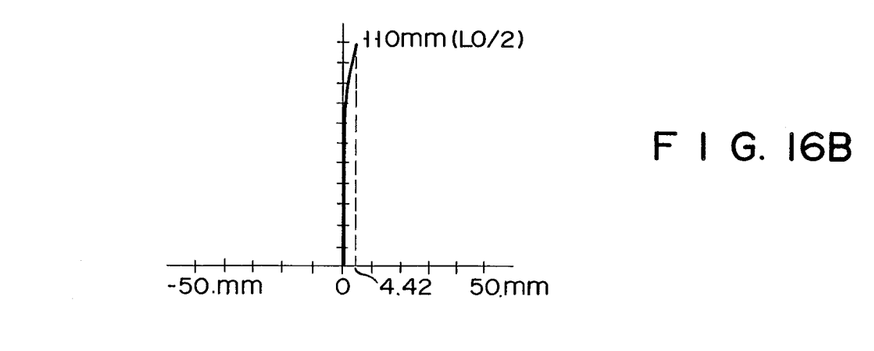

FIGS. 16A and 16B show the result of simulation in which distance R of focusing point CT from rotation center O of polygon mirror 1 was set to 443.125 mm, radius Rm of the inscribed circle of polygon mirror 1 was set to 25.0 mm, and long and short radii b and c of ellipse 2 were respectively set to 81.640625 mm and 56.8074427 mm.

In this case, as is shown in FIG. 16A, the error in scanning linearity was suppressed such that its highest value was below −1.05 mm (−0.48%), and as is shown in FIG. 16B, the curvature of the image field was suppressed such that its maximum value was below 4.42 mm (0.99%).

As can be clearly understood from the examples described above, the error in scanning linearity and the curvature of the image field can be suppressed to sufficiently small values by selectively setting distance R of focusing point CT from rotation center O of polygon mirror 1, radius Rm of the inscribed circle of polygon mirror 1, and long and short radii b and c of ellipse 2 to suitable values.

In each of the above examples, long and short radii b and c of ellipse 2 are respectively set on the x and y axes. However, it is possible to set radii b and c on the y and x axes, respectively, and rotation center O can be set to pass through the axis of radius b.

As described above, according to this invention, a post objective light deflector can be provided in which the error in scanning linearity and the curvature of the image field can be suppressed to be sufficiently small without the need to use electrical correction processing, thus enhancing the pattern forming precision.

What is claimed is:

1. A polygon mirror comprising a plurality of elliptic convex surfaces functioning as light reflection surfaces and each having substantially the same shape as the maximum curvature portion of an ellipse having a long axis b and a short axis c, said elliptic convex surfaces being uniformly arranged on the circumference of an inscribed circle whose center is set on said long axis b, whose radius is Rm, and which is in contact with the maximum curvature portion of said ellipse.

2. A polygon mirror according to claim 1, wherein said polygon mirror reflects an incident light beam while being rotated, and scans the incident light beam in the range of effective scanning length Lo on a preset scanning plane which is set at an incident light beam travelling distance R from the center of said inscribed circle of said polygon mirror.

3. A polygon mirror according to claim 2, wherein the light beam transmitted from said polygon mirror to said scanning plane is scanned on an x-y plane having the center of said inscribed circle as the origin, and when (1) a rotation angle of a preset point on said elliptic convex surface of said polygon mirror, from which the light beam is reflected, with respect to said long axis b, as viewed from the center of said inscribed circle is set to $\theta$, (2) and a distance between a center of said ellipse and the center of said inscribed circle is set to a, then $a = b - Rm$ and coordinates xo and yo at the preset point are substantially expressed as follows:

$$xo = \frac{-a + b\sqrt{1 - \frac{a^2 - b^2}{c^2}\tan^2\theta}}{1 + \frac{b^2}{c^2}\tan^2\theta}$$

$$yo = xo \cdot \tan\theta.$$

4. A polygon mirror according to claim 3, wherein differentiated values $dx/d\theta$ and $dy/d\theta$ of x and y coordinates at said preset point differentiated by said rotation angle $\theta$ and a differentiated value of $\beta$ differentiated by said rotation angle are expressed as follows:

$$\frac{dx}{d\theta} = -\frac{(l + \gamma)\sin\beta}{\cos(\theta - \beta)}$$

$$\frac{dy}{d\theta} = \frac{(l + \gamma)\cos\beta}{\cos(\theta - \beta)}$$

$$\frac{d\beta}{d\theta} = \frac{\frac{b^2}{c^2}\left(\frac{l + \gamma}{xo + a}\right)\left(\frac{yo \cdot \sin\beta}{xo + a} + \cos\beta\right)}{\left\{1 + \frac{b^4 \cdot y_o^2}{c^4(xo + a)^2}\right\} \cdot \cos(\theta - \beta)}$$

where $\gamma$, $\beta$, and l are defined as follows by using the values of xo, yo, a, b, c, R, and Rm:

$$\gamma = \sqrt{x_o^2 + y_o^2}$$

$$\beta = \tan^{-1}\left(\frac{b^2}{c^2} \cdot \frac{yo}{xo + a}\right)$$

$$l = \frac{c^2(R - Rm)}{2b(R - Rm) + c^2} - Rm$$

5. A polygon mirror according to claim 4, wherein coordinates xc and yc on said x-y plane of a light beam focusing point on said scanning plane are expressed as follows:

$$xc = xo + \frac{\left(\frac{dy}{d\theta} - \frac{dx}{d\theta}\tan(2\beta - \theta)\right)\cos^2(2\beta - \theta)}{1 - 2\frac{d\beta}{d\theta}}$$

$$yc = yo + \frac{\left(\frac{dy}{d\theta} - \frac{dx}{d\theta}\tan(2\beta - \theta)\right)\cos^2(2\beta - \theta)\tan(2\beta - \theta)}{1 - 2\frac{d\beta}{d\theta}}$$

6. A polygon mirror according to claim 5, wherein a distance between the center of said inscribed circle and said preset point is set to $\gamma$, rotation angle $\theta$ is set to $\theta o$ when the y coordinate of said focusing point on said scanning plane is equal to half the effective scanning length Lo, that is, when $y = Lo/2$, and Lo, R, $\gamma$, and $\beta$ are determined to satisfy the following expression:

$$-0.02 Lo \leq (R - \gamma)\tan 2(\theta - \beta) - \frac{\theta}{\theta o} Lo \leq 0.02 Lo$$

7. A polygon mirror according to claim 6, wherein R, xc, and yc are determined to satisfy the following expression:

$$-0.05R < xc \cdot \cos\theta + yc \cdot \sin\theta - R \leq 0.05R.$$

8. A polygon mirror according to claim 5, wherein R, xc, and yc are determined to satisfy the following expression:

$$-0.05R < xc \cdot \cos\theta + yc \cdot \sin\theta - R \leq 0.05R.$$

9. A post objective light deflecting apparatus comprising:
- a polygon mirror rotation body having a plurality of elliptic convex mirror surfaces uniformly arranged on the circumference of a circle having a radius Rm with a preset rotation center axis, wherein each of said elliptic mirror surfaces corresponds to a portion of an ellipse having a long axis b and a short axis c, which intersects said long axis b and is formed symmetrical with respect thereto, and said rotation center axis passes said long axis b and is perpendicular to the x-y plane defined by said long axis b and short axis c; and
- a photoreceptor drum having a light beam scanning plane positioned apart from said rotation center axis by preset distance R, wherein each of said elliptic convex mirror surfaces reflects an incident light beam towards said light beam scanning plane, and the reflected light beam is scanned in a range of preset scanning length Lo on said light beam scanning plane by rotating said polygon mirror rotation body.

10. An apparatus according to claim 9, wherein each of said elliptic convex mirror surfaces has a light beam reflection point, and when a rotation angle of said light beam reflection point with respect to said long axis b, as viewed from said preset rotation center axis, is expressed by $\theta$, and a distance between the center of said ellipse and the preset rotation center axis is expressed by a, then coordinates xo and yo of said light beam reflection point on said x-y plane are expressed as follows:

$$xo = \frac{-a + b\sqrt{1 - \frac{a^2 - b^2}{c^2}\tan^2\theta}}{1 + \frac{b^2}{c^2}\tan^2\theta}$$

$$yo = xo \cdot \tan\theta.$$

11. An apparatus according to claim 10, wherein differentiated values $dx/d\theta$ and $dy/d\theta$ of x and y coordinates at said light beam reflection point differentiated by said rotation angle $\theta$ and differentiated value of $\beta$ differentiated by said rotation angle $\theta$ are expressed as follows:

$$\frac{dx}{d\theta} = -\frac{(l + \gamma)\sin\beta}{\cos(\theta - \beta)}$$

$$\frac{dy}{d\theta} = \frac{(l + \gamma)\cos\beta}{\cos(\theta - \beta)}$$

$$\frac{d\beta}{d\theta} = \frac{\frac{b^2}{c^2}\left(\frac{l + \gamma}{xo + a}\right)\left(\frac{yo \cdot \sin\beta}{xo + a} + \cos\beta\right)}{\left\{1 + \frac{b^4 \cdot y_o^2}{c^4(xo + a)^2}\right\} \cdot \cos(\theta - \beta)}$$

where $\gamma$, $\beta$, and l are defined as follows by using the values of xo, yo, a, b, c, R, and Rm:

$$\gamma = \sqrt{x_o^2 + y_o^2}$$

$$\beta = \tan^{-1}\left(\frac{b^2}{c^2} \cdot \frac{yo}{xo + a}\right)$$

$$l = \frac{c^2(R - Rm)}{2b(R - Rm) + c^2} - Rm$$

12. An apparatus according to claim 11, wherein coordinates xc and yc on said x-y plane of a light beam focusing point on said scanning plane are expressed as follows:

$$xc = xo + \frac{\left(\frac{dy}{d\theta} - \frac{dx}{d\theta}\tan(2\beta - \theta)\right)\cos^2(2\beta - \theta)}{1 - 2\frac{d\beta}{d\theta}}$$

$$yc = yo + \frac{\left(\frac{dy}{d\theta} - \frac{dx}{d\theta}\tan(2\beta - \theta)\right)\cos^2(2\beta - \theta)\tan(2\beta - \theta)}{1 - 2\frac{d\beta}{d\theta}}$$

13. An apparatus according to claim 12, wherein a distance between said rotation center axis and said light beam reflection point is set to $\gamma$, rotation angle $\theta$ is set to $\theta o$ when the y coordinate of said focusing point on said scanning plane is equal to half the scanning length Lo, that is, when y=Lo/2, and Lo, R, $\gamma$, and $\beta$ are determined to satisfy the following expressions:

$$-0.02Lo \leq (R - \gamma)\tan 2(\theta - \beta) - \frac{\theta}{\theta o} Lo \leq 0.02Lo$$

14. An apparatus according to claim 13, wherein R, xc, and yc are determined to satisfy the following expression:

$$-0.05R < xc \cdot \cos\theta + yc \cdot \sin\theta - R \leq 0.05R.$$

15. An apparatus according to claim 12, wherein R, xc, and yc are determined to satisfy the following expression:

$$-0.05R < xc \cdot \cos\theta + yc \cdot \sin\theta - R \leq 0.05R.$$

16. A post objective light deflector comprising a polygon mirror which has a plurality of elliptically-curved convex mirror surfaces and has a rotation axis which is perpendicular to the major and minor axes of an ellipse and passing the major axis of said ellipse, wherein said ellipse has long and short radii b and c on the major and minor axes, respectively, and passes along one of said elliptically-curved convex mirror surfaces, the radius of an inscribed circle of said polygon mirror is set to Rm, a distance from said rotation axis to a scanning plane is set to R, an effective scanning length is set to Lo, a rotation angle of said polygon mirror is set at "0", and a y coordinate of a beam spot is set at "0" when an extension of said long radius b passes a predetermined point on said scanning plane, and $\theta$ is set at "$\theta o$" when a y coordinate of a beam spot is set at Lo/2; and the following equations are obtained in the range of rotation angle $\theta$ ($-\theta o \leq \theta \leq \theta o$) of said polygon mirror:

$$xc = xo + \frac{\left(\frac{dy}{d\theta} - \frac{dx}{d\theta}\tan(2\beta - \theta)\right)\cos^2(2\beta - \theta)}{1 - 2\frac{d\beta}{d\theta}}$$

$$yc = yo + \frac{\left(\frac{dy}{d\theta} - \frac{dx}{d\theta}\tan(2\beta - \theta)\right)\cos^2(2\beta - \theta)\tan(2\beta - \theta)}{1 - 2\frac{d\beta}{d\theta}}$$

where:

$$xo = \frac{-a + b\sqrt{1 - \frac{a^2 - b^2}{c^2}\tan^2\theta}}{1 + \frac{b^2}{c^2}\tan^2\theta}$$

$$yo = \frac{-a + b\sqrt{1 - \frac{a^2 - b^2}{c^2}\tan^2\theta}}{1 + \frac{b^2}{c^2}\tan^2\theta} \cdot \tan\theta$$

$$\beta = \tan^{-1}\left(\frac{b^2}{c^2} \cdot \frac{yo}{xo + a}\right)$$

$$\gamma = \sqrt{xo^2 + yo^2}$$

and the following expressions are satisfied in a condition where $a = b - Rm$:

$$-0.02 Lo \leq (R - \gamma)\tan 2(\theta - \beta) - \frac{\theta}{\theta o} Lo \leq 0.02 Lo$$

(error in the scanning linearity)
$-0.05R < xc \cdot \cos\theta + yc \cdot \sin\theta - R \leq 0.05R$ (error in the curvature of the image field).

* * * * *